US006182222B1

(12) United States Patent
Oparaji

(10) Patent No.: US 6,182,222 B1
(45) Date of Patent: Jan. 30, 2001

(54) SECURE DATA STORAGE SYSTEM AND METHOD

(75) Inventor: Kelechi I. Oparaji, Farmington, MI (US)

(73) Assignee: Electronic Data Systems Corporation, Plano, TX (US)

(*) Notice: Under 35 U.S.C. 154(b), the term of this patent shall be extended for 0 days.

(21) Appl. No.: 08/824,222

(22) Filed: Mar. 25, 1997

(51) Int. Cl.[7] ................................................ G06F 12/14
(52) U.S. Cl. .................................... 713/200; 713/202
(58) Field of Search .......................... 395/187.01, 700; 380/21, 23, 24, 25; 340/825.34; 713/100, 200, 201, 202

(56) References Cited

U.S. PATENT DOCUMENTS

| | | | |
|---|---|---|---|
| 3,938,091 | * | 2/1976 | Atalla et al. ..................... 340/149 |
| 4,198,619 | * | 4/1980 | Atalla ............................. 340/149 |
| 4,203,166 | * | 5/1980 | Ehrsam et al. ..................... 375/2 |
| 4,588,991 | * | 5/1986 | Atalla ........................ 340/825.31 |
| 5,414,852 | * | 5/1995 | Kramer et al. ................... 395/700 |
| 5,499,297 | * | 3/1996 | Boebert ............................ 380/23 |
| 5,596,718 | * | 1/1997 | Boebert et al. ................ 395/187.01 |
| 5,953,419 | * | 9/1999 | Lohstroh et al. ..................... 380/21 |

OTHER PUBLICATIONS

Microsoft Access "Building Applications", 1994.*
"Microsoft ACCESS" User's Guide, by Microsoft Corporation, © 1994, Table of Contents and Chapter 14, Securing Your Application.

* cited by examiner

*Primary Examiner*—Glenn A. Auve
*Assistant Examiner*—Tim T. Vo
(74) *Attorney, Agent, or Firm*—L. Joy Griebenow; Baker & Botts L.L.P.

(57) ABSTRACT

A secure data storage system (28) may comprise a secured data file (40), a secured system file (44), and a data file application (42). The secured data file (40) may have a verification system (48) operable to allow access to the secured data file (40) only upon receipt of a unique identifier (84, 90) matching a stored, unique identifier (50). The data file application (42) may be operable to communicate the unique identifier (84, 90) to the secured data file (40) to access the data file (40) in a secured session. The secured system file (44) may be linked to the data file application (42) to establish access privileges during the secured session.

20 Claims, 2 Drawing Sheets

SECURE DATA STORAGE SYSTEM AND METHOD

TECHNICAL FIELD OF THE INVENTION

The present invention relates generally to the field of data storage, and more particularly to a secure data storage system and method.

BACKGROUND OF THE INVENTION

Computer systems generally include one or more information or data storage systems. Data storage systems receive and store data for later recall and use by computer systems. A data storage system may include databases, spreadsheet files, text files and the like.

To prevent unauthorized access, manipulation, and/or use of stored data, data storage systems are often secured. Data storage systems have been secured by requiring a user to enter an ID and/or password to launch an application capable of accessing a data file. Entry of ID and/or password is time-consuming and burdensome in that the user must enter the ID and/or password each time the application is launched, whether or not an existing data file is to be accessed. Moreover, an unsecured application may be used to access the data file. This is particularly problematic in client/server systems where an unsecured application may access data files over a network.

SUMMARY OF THE INVENTION

Accordingly, a need has arisen in the art for improved data storage security. The present invention provides a secure data storage system and method that substantially reduces or eliminates problems associated with prior systems.

In accordance with the present invention, a secure data storage system may comprise a secured data file, a secured system file, and a data file application. The secured data file may include a verification system operable to allow access to the secured data file only upon receipt of a unique identifier matching a stored unique identifier. The data file application may be operable to communicate the unique identifier to the secured data file to access the secured data file in a secured session. The secured system file may be linked to the data file application to establish access privileges during the secured session.

More specifically, in accordance with one embodiment of the present invention, the verification system may include a supervisor-unique identifier and an operator-unique identifier. In this embodiment, the secured system file may include access privileges of the supervisor-unique identifier and the operator-unique identifier. A supervisor access module may be operable to communicate the supervisor-unique identifier to the data file application. An operator access module may be operable to communicate the operator-unique identifier to the data file application.

In accordance with another aspect of the present invention, the secure data storage system may include a default system file. The default system file may be linked to the data file application to allow unsecured access to the data file application.

Technical advantages of the present invention include providing a secure data storage system. In particular, a secured data file may be accessed only upon receipt of a unique identifier matching a stored unique identifier. Access privileges of the unique identifier may be stored in a secured systems file that may be linked to a data file application to establish access privileges during a secured session. Accordingly, an unsecured application may not access the secured data file.

Additional technical advantages of the present invention include providing a secure data storage system in which a data file application may be launched without entry of a user ID and/or password. In particular, a default system file may be linked to the data file application to allow unsecured access to the data file application. Accordingly, the data file application may be accessed without unnecessary and time-consuming entry of IDs and/or passwords when a secured data file is not to be accessed.

Other technical advantages of the present invention will be readily apparent to one skilled in the art from the following figures, descriptions, and claims.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

Figure 1:
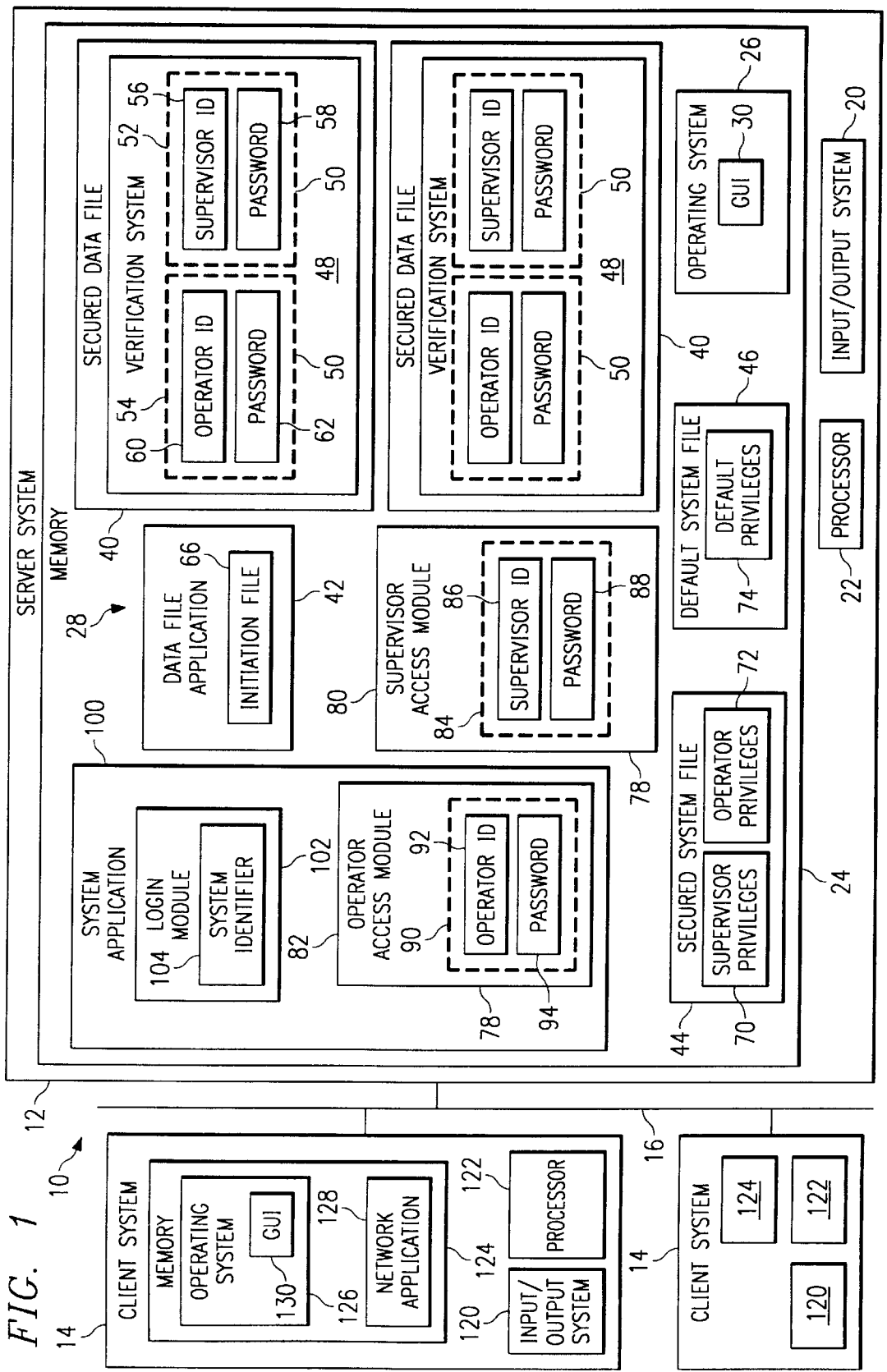
FIG. 1 is a block diagram illustrating a secure data storage system in accordance with one embodiment of the present invention.
Figure 2:
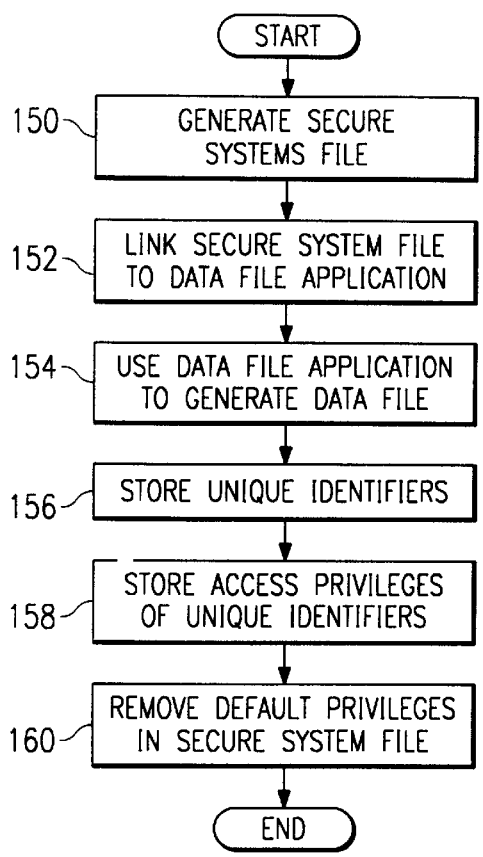
FIG. 2 is a flow diagram illustrating a method of securing the data file of FIG. 1 in accordance with one embodiment of the present invention.
Figure 3:
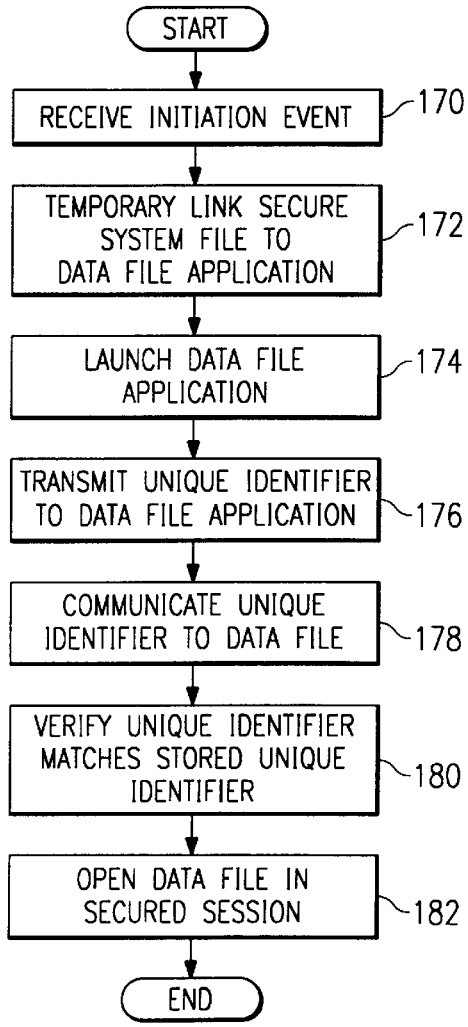
FIG. 3 is a flow diagram illustrating a method of accessing the data file of FIG. 1 in the secured session in accordance with one embodiment of the present invention.

The preferred embodiments of the present invention and it advantages are best understood by referring now in more detail to FIGS. 1–3 of the drawings, in which like numerals refer to like parts. FIGS. 1–3 illustrate a secure data storage system and method. As described in more detail below, the secure data storage system and method may include a verification system operable to allow access to a data file only upon the receipt of a unique identifier matching a stored unique identifier. Accordingly, the data file may not be accessed by an unsecured application using a default identifier or otherwise lacking the unique identifier.

FIG. 1 illustrates a network interconnection 10 including the secure data storage system in accordance with one embodiment of the present invention. It will be understood that the secure data storage system may be otherwise configured within the scope of the present invention. For example, the secure data storage system may operate on a stand alone system.

The network interconnection 10 may comprise a server system 12 connected to one or more client systems 14 via a network 16. The server system 12 may be a computer such as a personal computer, file server, workstation, minicomputer, mainframe, or any other computer capable of communicating and interconnecting with other computers.

The server system 12 may comprise an input/output system 20, a processor 22, and memory 24. The input/output system 20 may connect the network 16 and other input and output devices to the server system 12. The network 16 may be directly connected to the server system 12 or may be connected through a data transmission device such as a modem or the like. Input devices may include a pointing device such as a mouse or trackpad, a keyboard, and the like. Output devices may include a monitor, a printer, and the like.

The server system 12 includes computer software that may be loaded into the memory 24 and executed by the processor 22. The computer software may generally be identified by modules and similar systems in memory 24. It will be understood that the computer software may be otherwise combined and/or divided for processing within the scope of the present invention. Accordingly, labels of the modules and other software systems are for illustrative purposes and may be varied within the scope of the present invention.

The computer software may be loaded into memory 24 from disk storage (not shown). Disk storage may include a variety of types of storage media. For example, disk storage may include floppy disk drives, hard disk drives, CD/ROM drives, or magnetic tape drives.

Memory 24 may include an operating system 26 and a secure data storage system 28. In one embodiment, the operating system 26 may include a graphical user interface (GUI) 30. In this embodiment, the operating system 26 may be MacIntosh OS, WINDOWS NT, WINDOWS 95, OS/2, or any other type of graphical operating system. It will be understood that other types of operating systems, including non-graphical operating systems, may be used within the scope of the present invention.

The secure data storage system 28 may comprise one or more secured data files 40, a data file application 42, a secured system file 44, and a default system file 46. In one embodiment, the secured data file 40 is a database. It will be understood that the secured data file 40 may comprise other types of files within the scope of the present invention. For example, the secured data file 40 may be a spreadsheet, a text file, or the like.

The secured data file 40 may include a verification system 48. The verification system 48 may allow access to the secured data file 40 only upon receipt of a unique identifier matching a stored unique identifier 50. The verification system 48 may include a plurality of stored unique identifiers 50. Each stored unique identifier 50 may comprise one or more fields, such as ID, password and the like.

For the embodiment of FIG. 1, the verification system 48 may include a supervisor-unique identifier 52 and an operator-unique identifier 54. The supervisor-unique identifier 52 may comprise a supervisor ID 56 and a password 58. Similarly, the operator-unique identifier 54 may comprise an operator ID 60 and a password 62. It will be understood that the verification system 48 may include other unique identifiers 50 within the scope of the present invention. For example, the verification system 48 may include a programmer-unique identifier to allow programming access to the secured data file 40. It will be further understood that the unique identifiers 50 may include fewer, additional, or other fields and still remain within the scope of the present invention.

The data file application 42 may access the secured data file 40 by communicating a unique identifier to the secured data file 40 that matches one of the stored unique identifiers 50. Upon verification of a unique identifier communicated by the data file application 42, the secured data file 40 may be opened in a secured session. On the other hand, an application using a default identifier or otherwise unable to transmit a matching unique identifier will be unable to access the secured data file 40. Thus, an unsecured application connectable to the server system 12 via the network 16 will be unable to access the secured data file 40.

The data file application 42 may be linked to the secured or default system files 44 and 46 to provide access privileges of an identifier during a session. In one embodiment, the data file application 42 may be linked to a system file by an initialization file 66 including a pointer to that system file. In this embodiment, the data file application 42 may be Microsoft ACCESS and the secured data file 40 may be a Microsoft ACCESS database. The secured and default system files 44 and 46 may be Microsoft Database Administrator (MDA) files. It will be understood that the secured data file 40, data file application 42, and secured and default system files 44 and 46 may be other types of files and applications within the scope of the present invention. Moreover, it will be understood that the data file application 42 may be an extension or other type of application capable of accessing the secured data file 40.

As previously described, the secured and default system files 44 and 46 may provide access privileges associated with an identifier during a session. The secured system file 44 may be linked to the data file application 42 to establish access privileges associated with a unique identifier during a secured session. In one embodiment, access to the secured data file 40 may be limited to the stored unique identifiers 50 by stripping any default privileges from the secured system file 44. Default privileges are privileges associated with default identifiers of the secured data file 40 and/or the data file application 42. The default privileges may be stripped by denying the default identifiers any and all access to the secured data file 40.

For the embodiment of FIG. 1, the secured system file 44 may include supervisor privileges 70 associated with the supervisor-unique identifier 52 and operator privileges 72 associated with the operator-unique identifier 54. In this embodiment, an operator may have modification and view privileges while a supervisor may have additional privileges such as query, create table, and the like. It will be understood that access privileges of the unique identifiers may vary within the scope of the present invention. It will be further understood that the secured system file 44 may include access privileges of other unique identifiers and still remain within the scope of the present invention.

The default system file 46 may be linked to the data file application 42 to allow the data file application 42 to be accessed in an unsecured session. The default system file 46 may also establish default privileges 74 during the unsecured session. This allows the data file application 42 to be used without the entry of IDs and/or passwords when the secured data file 40 is not to be accessed. Accordingly, IDs and/or passwords need not be unnecessarily entered.

In one embodiment, the default system file 46 may be initially linked to the data file application 42 and the secure data storage system 28. Accordingly, data file application 42 may be used without entry of IDs and/or passwords. In this embodiment, the secured system file 44 may be temporarily linked to the data file application 42 when the secured data file 40 is to be accessed.

In accordance with one embodiment of the present invention, the secured system file 44 may be linked to the data file application 42 by one or more access modules 78. The access module 78 may also transmit a unique identifier of that access module 78 to the data file application 42. It will be understood that the unique identifier may be otherwise received by the data file application 42 within the scope of the present invention. For example, the unique identifier may be inputted directly by a user in response to a logon screen provided by the data file application 42.

For the embodiment of FIG. 1, a supervisor access module 80 and an operator access module 82 may be provided. The supervisor access module 80 may comprise a supervisor-unique identifier 84 matching the supervisor-unique identifier 52 stored in the secured data file 40. Accordingly, the supervisor-unique identifier 84 may include a supervisor ID 86 and a password 88. It will be understood that the supervisor-unique identifier 84 may comprise fewer, additional or other fields and still remain within the scope of the present invention.

The supervisor access module 80 may launch the data file application 42, ensure that the secured system file 44 is linked to the data file application 42 to provide supervisor privileges 70 in a secured session, and transmit the supervisor-unique identifier 84 to the data file application 42. As previously described, the data file application 42 may communicate the supervisor-unique identifier 84 to the secured data file 40 to access a secured data file 40 in a secured session. During the secured session, the user will have supervisor privileges 70 as established by the secured system file 44.

The supervisor access module 80 should be secured or removed from the server system 12 when not in use to prevent unauthorized use of the supervisor access module 80 to access the secured data file 40. Accordingly, only authorized users may use the supervisor access module 80 to access the secured data file 40. Additionally, the supervisor-unique identifier 84 should be encrypted in the supervisor access module 80 to prevent unauthorized users from discovering the composition of the supervisor-unique identifier 84.

The operator access module 82 may comprise an operator-unique identifier 90 matching the operator-unique identifier 54 stored in the secured data file 40. Accordingly, the operator-unique identifier 90 may include an operator ID 92 and a password 94. It will be understood that the operator-unique identifier 90 may comprise fewer, additional or other fields and still remain within the scope of the present invention.

The operator access module 82 may launch the data file application 42, ensure that the secured system file 44 is linked to the data file application 42 to provide operator privileges 72 in a secured session, and transmit the operator-unique identifier 90 to the data file application 42. As previously described, the data file application 42 may communicate the operator-unique identifier 90 to the secured data file 40 to access the secured data file 40 in a secured session. During the secured session, the user will have operator privileges 72 as established by the secured system file 44.

In one embodiment, the operator access module 82 may be part of a system application 100. In this embodiment, the system application 100 may launch the operator access module 82. The system application 100 may be a customized program that uses the secured data file 40 and the data file application 42 along with other applications and files to manage a section or resources of a business, venture or the like. The system application 100 may be programmed in visual basic, Fox Pro, C++ or other program languages capable of launching the data file application 42 to access the secured data file 40.

The system application 100 should be secured to prevent unauthorized use of the operator access module 82 to access the secured data file 40. In one embodiment, the system application 100 may include a login module 102. The login module 102 may allow access to the system application 100 only upon receipt of a system identifier matching a stored system identifier 104. Accordingly, only authorized users may access the system application 100 and use the operator access module 82 to access the secured data file 40. Additionally, the operator-unique identifier 90 should be encrypted in the operator access module 82 to prevent unauthorized users from discovering the composition of the operator's unique identifier 90.

The client system 14 of the network interconnection 10 may be similar to the server system 12 and may be implemented using virtually any type of computer. Thus, the client system 14 may be a personal computer, file server, work station, minicomputer, mainframe, or any other computer capable of communicating and interconnecting with other computers.

The client system 14 may comprise an input/output system 120, a processor 122, and memory 124. The input/output system 120 may connect the network 16 and other input and output devices to the client system 14. The network 16 may be directly connected to the client system 14 or may be connected through a data transmission device such as a modem or the like. Input devices may include a pointing device such as a mouse or trackpad, a keyboard, or the like. Output devices may include a monitor, a printer, and the like.

The client system 14 includes computer software that may be loaded into the memory 124 and executed by the processor 122. The computer software may generally be identified by modules and similar systems in memory 124. It will be understood that the computer software may be otherwise combined and/or divided for processing within the scope of the present invention. Accordingly, labels of the modules or other software systems are for illustrative purposes and may be varied within the scope of the present invention.

The computer software may be loaded into memory 124 from disk storage (not shown). As previously described in connection with the server system 12, disk storage may include a variety of types of storage media such as floppy disk drives, hard disk drives, CD/ROM drives, or magnetic tape drives.

Memory 124 may include an operating system 126 and a network application 128. In one embodiment, the operating system 126 may include a graphical user interface (GUI) 130. In this embodiment, the operating system 126 may be MacIntosh OS, WINDOWS NT, WINDOWS 95, OS/2, or any other type of graphical operating system. It will be understood that other types of operating systems, including non-graphical operating systems, may be used within the scope of the present invention.

The network application 128 may connect to the server system 12 via the network system 16 and access the system application 100. As previously described, the system application 100 may be accessed by transmitting a system identifier matching the system identifier 104 stored in the login module 102 of the system application 100. After the system application 100 has been accessed, the user may utilize the operator access module 82 to access the secured data file 40. Accordingly, the secured data file 40 may be remotely accessed and still be secured against unauthorized use.

The network 16 may be any type of communication link capable of supporting data transfer. In one embodiment, the network 16 may include any combination of an Integrated Services Digital Network (ISDN) communication line, a hardware line, or telephone link. It will be understood that the network 16 may comprise other types of communication links within the scope of the present invention.

FIG. 2 is a flow diagram illustrating a method of securing the secured data file 40 in accordance with one embodiment of the present invention. The method begins at step 150 wherein the secured system file 44 is generated. For a Microsoft ACCESS embodiment, the secured system file 44 may be generated by making a copy of the default system file 46 of the data file application 42. The copied default system file may then be customized to secure the file. In this embodiment, the secured and default system files 44 and 46 may be Microsoft Database Administrator (MDA) files. It will be understood that the secured and default system files 44 and 46 may comprise other types of files within the scope of the present invention. It will be further understood that the secured system file 44 may be otherwise generated and still remain within the scope of the present invention.

Proceeding to step 152, the secured system file 44 may be linked to the data file application 42. In the Microsoft ACCESS embodiment, the secured system file 44 may be linked to the data file application 42 by the initialization file 66 of the data file application 42 having a pointer to the secured system file 44. Next, at step 154, the data file application 42 may generate the secured data file 40.

At step 156, unique identifiers may be stored in the secured data file 40. As previously described, the unique identifiers will prevent unauthorized access to the secured data file 40. For the embodiment of FIG. 1, the unique identifiers may include the supervisor-unique identifier 52 and the operator-unique identifier 54. The supervisor- and operator-unique identifiers 52 and 54 may be stored in the verification system 48 of the secured data file 40.

Next, at step 158, access privileges of the unique identifiers may be stored. For the embodiment of FIG. 1, an operator may have modification and few privileges while a supervisor may have additional privileges such as query, create table, and the like. It will be understood that access privileges of the unique identifiers may vary within the scope of the present invention. As previously described, access privileges of the unique identifiers may be stored in the secured system file 44.

Proceeding to step 160, default privileges may be removed from the secured system file 44. As previously described, default privileges are privileges associated with default identifiers of the secured data file 40 and/or the data file application 42. Removal of the default privileges will limit secured data file 40 access to the unique identifiers stored in the verification system 48 of the secured data file 40. Accordingly, the secured data file 40 may not be accessed by an unsecured application using a default identifier or otherwise without the unique identifier. Step 160 leads to the end of the process.

FIG. 3 is a flow diagram illustrating a method of accessing the secured data file 40 using the operator access module 82 in accordance with one embodiment of the present invention. It will be understood that the supervisor or other access modules may similarly access the secured data file 40. The method begins at step 170 wherein an initiation event is received by the operator access module 82. In one embodiment, the initiation event may be a request to access a secured data file 40 by the system application 100.

Proceeding to step 172, the operator access module 82 may temporarily link the secured system file 44 to the data file application 42. As previously described, the default system file 46 may be initially linked to the data file application 42 to allow the data file application 42 to be used without entry of a unique identifier.

Next, at step 174, the operator access module 82 may launch a data file application 42. At step 176, the operator access module 82 may transmit the operator-unique identifier 90 to the data file application. As previously described, the operator-unique identifier 90 may be encoded in the operator access module 82.

Proceeding to step 178, the data file application 42 may communicate the operating unique identifier 90 received from the operator access module 82 to the secured data file 40. At step 180, the secured data file 40 may verify that the operator-unique identifier 90 matches the stored operator-unique identifier 54. If the operator-unique identifier 90 communicated by the data file application 42 matches the stored operator-unique identifier 54 of the secured data file 40, the secured data file 40 may, at step 182, be opened in a secured session. Conversely, if the identifier communicated by the data file application file 42 does not match a stored unique identifier of the secured data file 40, the secured data file 40 may not be accessed. At this point, the process ends.

In accordance with the foregoing, the secure data storage system and method of the present invention substantially improve data file security. In particular, the data file may be accessed only upon receipt of a unique identifier matching the storage unique identifier. Accordingly, an unsecured application may not access the data file.

In accordance with another aspect of the present invention, the data file application may be launched without entry of a user ID and/or password where the data file is not to be accessed. In particular, a default system file may be linked to the data file application to allow unsecured access to the data file application. Accordingly, time is not wasted entering IDs and/or passwords where no sensitive data is to be accessed.

Although the present invention has been described with several embodiments, various changes and modifications may be suggested to one skilled in the art. It is intended that the present invention encompass such changes and modifications as falls within the scope of the appended claims.

What is claimed is:

1. A method of securing a data file, comprising the steps of:

providing a data file application operable to generate secured data files, each secured data file having an associated stored unique identifier;

providing a verification system in each of the secured data files to allow access to a particular one of the secured data files only upon receipt of a unique identifier matching the stored unique identifier associated with the particular secured data file;

providing a secured system file including access privileges of the unique identifier;

communicating the unique identifier to the particular secured data file to access the particular secured data file in a secured session; and linking the secured system file to the data file application to establish access privileges during the secured session.

2. The method of claim 1, further comprising the step of eliminating access to the particular secured data file upon receipt of a default identifier of the particular secured data file.

3. The method of claim 1, further comprising the step of eliminating from the secured system file access privileges of a default identifier of the particular secured data file.

4. The method of claim 1, further comprising the step of providing a system application having an access module to communicate the unique identifier to the data file application.

5. The method of claim 1, further comprising the steps of:
the verification system of the particular secured data file storing a supervisor-unique identifier and an operator-unique identifier; and
the secured system file providing access privileges of the supervisor-unique identifier and the operator-unique identifier.

6. The method of claim 1, further comprising the steps of:
providing a default system file; and
linking the default system file to the data file application to allow unguarded access to the data file application.

7. The method of claim 5, further comprising the steps of:
providing a supervisor access module to communicate the supervisor-unique identifier to the data file application; and
providing an operator access module to communicate the operator-unique identifier to the data file application.

8. A secure data storage system, comprising:
a data file application operable to generate secured data files, each secured data file having an associated stored unique identifier;
a verification system in each of the secured data files operable to allow access to a particular one of the secured data files only upon receipt of a unique identifier matching the stored unique identifier associated with the particular secured data file;
a secured system file including access privileges of the unique identifier;
wherein the data file application is operable to communicate the unique identifier to the particular secured data file to access the particular secured data file in a secured session; and
wherein the secured system file is linked to the data file application to establish access privileges during the secured session.

9. The secure data storage system of claim 8, the unique identifier further comprising an ID and a password.

10. The secure data storage system of claim 8, further comprising a system application having an access module operable to transmit the unique identifier to the data file application.

11. The secure data storage system of claim 8, further comprising:
the verification system of the particular secured data file including a supervisor-unique identifier and an operator-unique identifier;
the secured system file including access privileges of the supervisor-unique identifier and the operator-unique identifier;
a supervisor access module operable to communicate the supervisor-unique identifier to the data file application; and
an operator access module operable to communicate the operator-unique identifier to the data file application.

12. The secure data storage system of claim 8, further comprising:
a default system file; and
the default system file operable to be linked to the data file application to allow unsecured access to the data file application.

13. The secure data storage system of claim 8, the particular secured data file further comprising a database.

14. The secure data storage system of claim 10, the system application further comprising a login module operable to allow access to the system application upon receipt of a system identifier matching a stored system identifier.

15. A network system, comprising:
a server system, comprising:
a data file application operable to generate secured data files, each secured data file having an associated stored unique identifier;
a verification system in each of the secured data files operable to allow access to a particular one of the secured data files only upon receipt of a unique identifier matching the stored unique identifier associated with the particular secured data file;
a secured system file including access privileges of the unique identifier;
wherein the data file application is operable to communicate the unique identifier to the particular secured data file to access the particular secured data file in a secured session;
wherein the secured system file is linked to the data file application to establish access privileges during the secured session; and
a client system operable to connect to the server system over a network to remotely access the data file application.

16. The network system of claim 15, the server system further comprising a system application having an access module operable to transmit the unique identifier to the data file application.

17. The network system of claim 15, the server system further comprising:
the verification system of the particular secured data file including a supervisor-unique identifier and an operator-unique identifier;
the secured system file including access privileges of the supervisor-unique identifier and the operator-unique identifier;
a supervisor access module operable to communicate the supervisor-unique identifier to the data file application; and
an operator access module operable to communicate the operator-unique identifier to the data file application.

18. The network system of claim 15, the server system further comprising:
a default system file; and
the default system file operable to be linked to the data file application to allow the client unguarded access to the data file application.

19. The network system of claim 15, the particular secured data file further comprising a database.

20. The network system of claim 16, the system application further comprising of login module operable to allow the client system access to the system application upon receipt of a system identifier matching a stored system identifier.

* * * * *